United States Patent
Greig

(10) Patent No.: US 12,195,206 B2
(45) Date of Patent: Jan. 14, 2025

(54) EMBEDDED ELECTROSPRAY THRUSTER

(71) Applicant: Board of Regents, The University of Texas System, Austin, TX (US)

(72) Inventor: Amelia Diane Greig, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 164 days.

(21) Appl. No.: 18/149,898

(22) Filed: Jan. 4, 2023

(65) Prior Publication Data

US 2023/0211897 A1    Jul. 6, 2023

Related U.S. Application Data

(60) Provisional application No. 63/266,427, filed on Jan. 5, 2022.

(51) Int. Cl.
*B64G 1/40* (2006.01)
*B64G 1/24* (2006.01)

(52) U.S. Cl.
CPC ............ *B64G 1/405* (2013.01); *B64G 1/244* (2019.05); *B64G 1/402* (2013.01)

(58) Field of Classification Search
CPC ......... B64G 1/405; B64G 1/413; B64G 1/411
See application file for complete search history.

(56) References Cited

U.S. PATENT DOCUMENTS

| | | | |
|---|---|---|---|
| 10,220,966 B2 * | 3/2019 | Koehler | F02K 9/80 |
| 10,330,090 B2 * | 6/2019 | King | F03H 1/005 |
| 11,104,456 B2 * | 8/2021 | Schilling | B64G 1/26 |
| 11,174,048 B2 * | 11/2021 | Koehler | F02K 9/94 |
| 11,359,613 B1 * | 6/2022 | Natisin | B64G 1/411 |
| 11,545,351 B2 * | 1/2023 | Perna | B05B 5/0533 |
| 2016/0010631 A1 * | 1/2016 | King | F03H 1/0056 60/202 |
| 2017/0283095 A1 * | 10/2017 | Koehler | B33Y 70/00 |
| 2019/0389602 A1 * | 12/2019 | Schilling | B64G 1/26 |
| 2020/0024003 A1 * | 1/2020 | Koehler | B33Y 70/00 |
| 2022/0194633 A1 * | 6/2022 | Vasconcelos da Costa | F03H 1/0012 |

FOREIGN PATENT DOCUMENTS

| | | | | |
|---|---|---|---|---|
| CN | 112109924 A | * | 12/2020 | |
| CN | 110230582 B | * | 1/2021 | ........ F03H 1/0012 |

OTHER PUBLICATIONS

Design and Testing of a CubeSat Rail integrated Electrospray Thruster, AIAA Video Library. https://video.aiaa.org/Title/eea4e2cf-ad8a-416d-ab21-d92c6efc073b. Aug. 2021.*

* cited by examiner

*Primary Examiner* — Philip J Bonzell
(74) *Attorney, Agent, or Firm* — Yee & Associates, P.C.

(57) ABSTRACT

An electrospray thruster with integrated propellant storage directly embedded into small satellite structural elements integrates the volume of the thruster into the volume of the rail.

20 Claims, 7 Drawing Sheets

EMBEDDED ELECTROSPRAY THRUSTER

CROSS-REFERENCE TO RELATED APPLICATION

This application claims the benefit of priority to U.S. Provisional Patent Application No. 63/266,427, filed Jan. 5, 2022, the entire contents of which are incorporated herein by reference.

BACKGROUND INFORMATION

1. Field

The present disclosure relates to small satellite maneuverability and more particularly to methods and devices for electrospray thrusters for CubeSat and other small satellite applications.

2. Background

Small satellite maneuverability is essential for formation and maintenance of satellite constellations, overcoming drag for extended mission durations in Low Earth Orbit (LEO), and precision control of satellite attitude.

Electrospray thrusters are small, solid-state propulsion systems with liquid propellant that have been extensively used for CubeSat and other small satellite applications. Electrospray thrusters use no moving parts and generate thrust by using capillary action to move their propellant to emitter tips then accelerate ionic propellant particles through a high voltage electrostatic field established between the emitters and an extractor.

Electrospray thrusters are low thrust for precision movements and have a specific impulse on the order of thousands of seconds. Although electrospray thrusters require high voltage to operate, the current is on the order of nano- to micro-Amps and the overall power consumption can be lower than one Watt.

Typical electrospray thrusters for CubeSat and other small satellite applications tend to focus on commercially provided, stand alone, plug and play style units that attach to the satellite structure. Mounting these units to existing satellite structure adds weight and drag to the satellite while also possibly infringing on valuable payload space of the satellite or creating deployment difficulties by inhibiting the CubeSat dispenser/Satellite adapter.

Therefore, it would be desirable to have an apparatus and method that takes into account at least some of the issues discussed above, as well as other possible issues.

SUMMARY

An example apparatus for propulsion of a satellite comprises an electrospray thruster embedded directly in the structure of the satellite. The electrospray thruster includes an insulated casing embedded within a propellant reservoir formed in the structure of the satellite. The electrospray thruster further includes an emitter array seated withing the insulated casing and spaced from an extractor grid within the insulated casing. A ground plate of the electrospray thruster surrounds the extractor grid and is flush with the surface of the structure of the satellite.

An example method of propelling a satellite includes embedding an electrospray thruster in a structure of the satellite and operating the electrospray thruster to propel the satellite.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments disclose an electrospray thruster embedded in the structure of a satellite, for example a CubeSat. The embedded electrospray thruster is fully contained within the structure of the satellite. The embedded electrospray thruster is meant to occupy previously unused volume inside the structural components of a satellite and therefore provide a propulsion and attitude control system with zero volume penalty and provide no obstructions to payload volume or interference with the mechanical operation of the satellite dispenser. The structural components of the satellite, for example being the rails that define the satellite shape and define the cargo volume of the satellite.

The electrospray thruster embedded within a rail of the satellite structure sits flush with the surface of the rail its embedded within to ensure nothing protrudes from the structure.

The design of the embedded electrospray thruster is based around the requirements of CubeSat Design Specifications which specify an 8.5 mm wide rail with one mm chamfers on each corner, leaving a 6.5 mm flat face on each side. Consequently, the embedded electrospray thruster is mounted within a propellant reservoir within a satellite rail, the propellant reservoir having approximate dimensions, for example, of 5 mm wide and 5 mm deep. A length of the propellant reservoir is chosen, for example 10 mm, in order to increase the size of the emitter array so as to maximize the total number of emitters for higher thrust density. The embedded electrospray thruster is designed to operate on the common ionic liquid propellant EMI-BF4.

Figure 1:
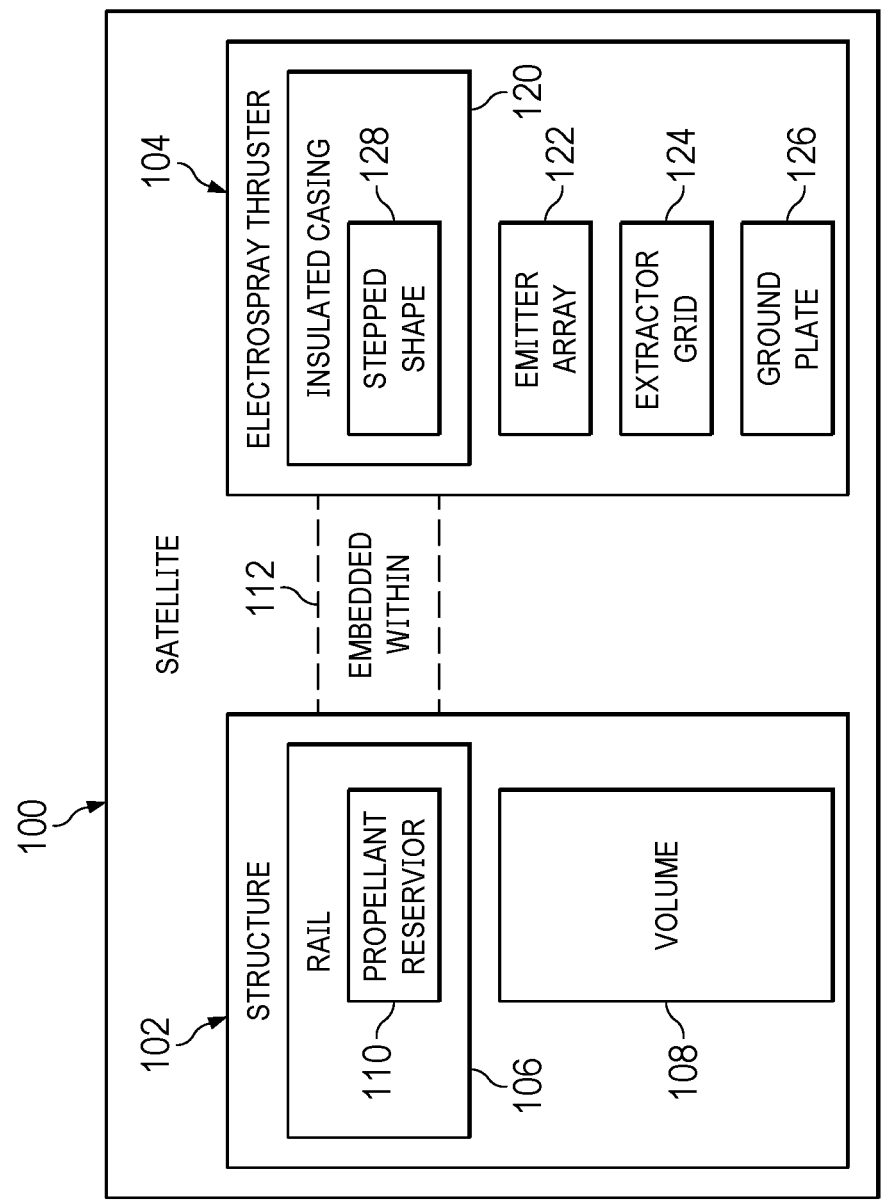
FIG. 1 is an illustration of a block diagram of a satellite with an embedded electrospray thruster in accordance with an illustrative embodiment.

With reference now to the figures, in particular, with reference to FIG. 1, an illustration of a block diagram of a satellite with an embedded electrospray thruster is depicted in accordance with an illustrative embodiment. In the illustrative examples, the same reference numeral may be used in more than one figure. This reuse of a reference numeral in different figures represents the same element in the different figures.

In the illustrative example, satellite 100 includes structure 102 and electrospray thruster 104. Electrospray thruster is embedded within 112 structure 102.

In this illustrative example, structure 102 of satellite 100 may be rail 106. A plurality of rails make up the general shape of the satellite. Structure 102, made up of a plurality of rails 106, has volume 108. Volume 108 is the space taken up by structure 102 of satellite 100. It is an object of the illustrated examples of an electrospray thruster to not increase volume 108 of structure 102.

As the name implies, for example, a CubeSat has a cubic shape. Each rail 106 is typically metallic and acts as a ground for the electricity used to operate an electrospray thruster. CubeSat rails, for example, have size requirements dictated by a specific CubeSat Design Specification (Revision 13). For example, the CubeSat Design Specifications specify an 8.5 mm wide rail with 1 mm chamfers on each corner. These dimensions leave a 6.5 mm flat face for the embedding of an electrospray thruster according to the illustrative examples. Each rail 106 that includes an embedded electrospray thruster 104 will include propellant reservoir 110 for embedding therein. Propellant reservoir 110 is inside rail 106. Should a rail include a plurality of electrospray thrusters, each electrospray thruster will be embedded in a corresponding propellant reservoir. Electrospray thruster 104 will be embedded within propellant reservoir 110 such that electrospray thruster 104 is flush with the flat face of rail 106 in which it is embedded. As a result, embedding electrospray thruster 104 within rail 106 will not increase volume 108 of structure 102 of satellite 100. It is understood that the embedded electrospray thruster of these illustrated examples is not limited to application to only CubeSats. Any satellite, utilizing construction of rails, struts, solid beams or rods where the addition of electrospray thrusters is desired without affecting the volume of the structure of the satellite, is envisioned.

In the illustrated example, electrospray thruster 104 includes insulated casing 120, emitter array 122, extractor grid 124, and ground plate 126.

Insulated casing 120 sits in propellant reservoir 110 embedded in rail 106 and seals in the high voltage propellant stored in propellant reservoir 110. As illustrated in detail in FIG. 5, insulated casing 120 has stepped shape 128 defined in its interior. Stepped shape 128 positions the other components of electrospray thruster relative to each other and relative to the propellant stored within propellant reservoir 110.

Insulated casing 120 is electrically insulating. For example, insulated casing may be comprised of a glass ceramic such as Macor®. Insulated casing 120 provides electrical isolation for emitter array 122.

Emitter array 122 may be comprised of conical porous borosilicate glass tips with pore sizes in the 1-10 micron range to enable wetted emitter operation and eliminate the need for micromachining propellant channels directly. Capillary action draws propellant from propellant reservoir 110 into emitter array 122 eliminating the need for back pressure or a pump. Due to stepped shape 128 of insulated casing 120, emitter array 122 is spaced on a first side from propellant stored in propellant reservoir 110 and spaced on a second side from extractor grid 124.

Extractor grid 124 is generally planar and may be comprised of a material that is electrically neutral with structure 102. For example, extractor grid 124 may be comprised of stainless steel 316 due to its structural, electrical, and machinability properties. Extractor grid 124 includes holes aligned with the glass tips of emitter array 122.

Ground plate 126 is generally planar and may be comprised of a material that is electrically neutral with structure 102. For example, ground plate 126 may be comprised of stainless steel 316 to match the thermal and electric properties of extractor grid 124. Ground plate 126 surrounds extractor grid 124. Ground plate 126 and extractor grid 124 are positioned in insulated casing 120 by stepped shape 128 of insulated casing 120 such that extractor grid 124 and ground plate 126 are flush with the surface of rail 106 of structure 102.

Figure 2:
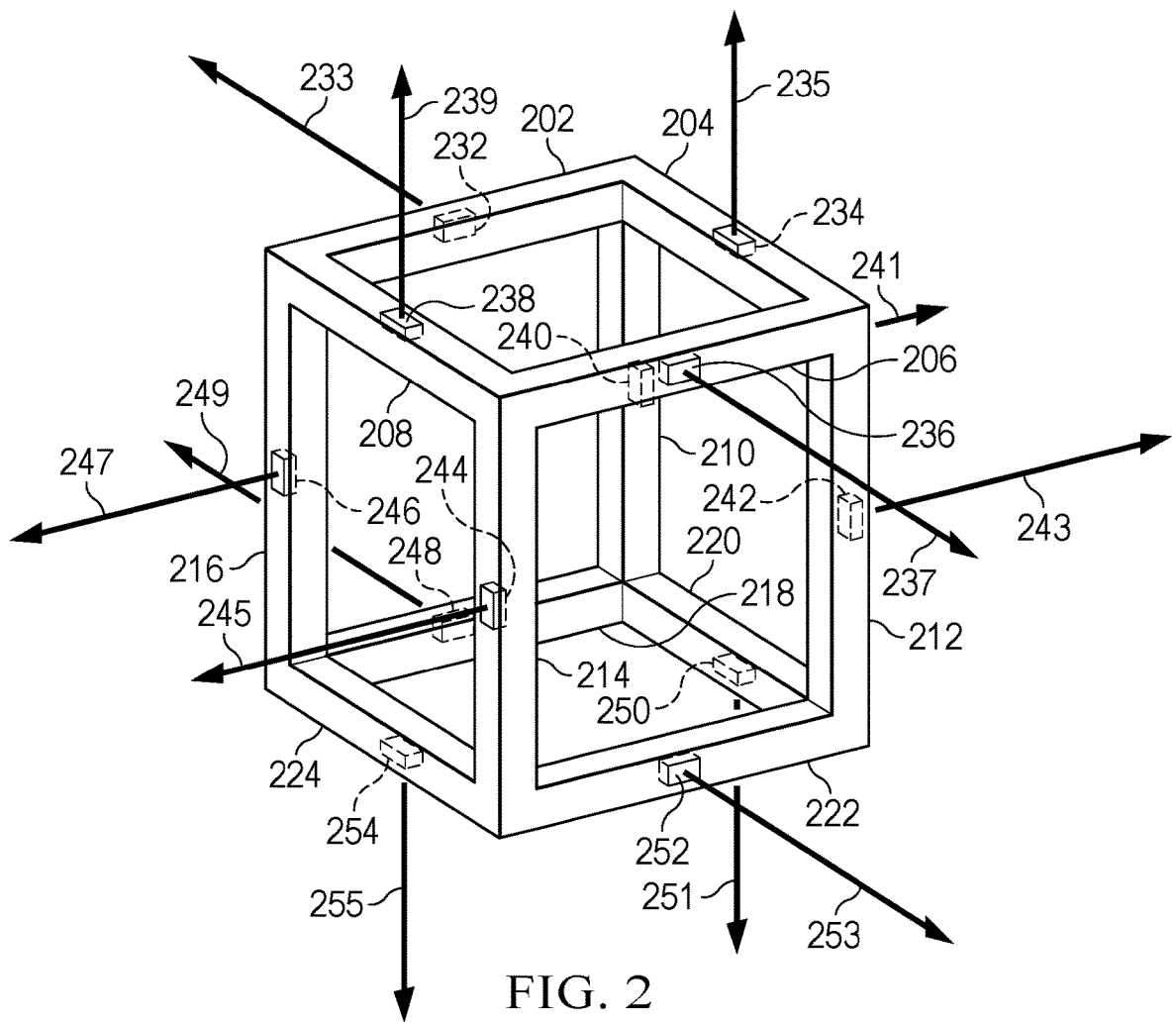
FIG. 2 illustrates a satellite with embedded electrospray thrusters, in accordance with an illustrative embodiment.

FIG. 2 illustrates CubeSat 200. CubeSat 200 is an example of one implementation of satellite 100 in FIG. 1. CubeSat 200 is comprised of rails 202, 204, 206, 208, 210, 212, 214, 216, 218, 220, 222, and 224 arranged in a cubic shape. It is understood that any shape satellite is capable of incorporating embedded electrospray thrusters as illustrated herein. Rail 202 includes electrospray thruster 232 providing thrust in direction 233. Rail 204 includes electrospray thruster 234 providing thrust in direction 235. Rail 206 includes electrospray thruster 236 providing thrust in direction 237. Rail 208 includes electrospray thruster 238 providing thrust in direction 239. Rail 210 includes electrospray thruster 240 providing thrust in direction 241. Rail 212 includes electrospray thruster 242 providing thrust in direction 243. Rail 214 includes electrospray thruster 244 providing thrust in direction 245. Rail 216 includes electrospray thruster 246 providing thrust in direction 247. Rail 218 includes electrospray thruster 248 providing thrust in direction 249. Rail 220 includes electrospray thruster 250 providing thrust in direction 251. Rail 222 includes electrospray thruster 252 providing thrust in direction 253. Rail 224 includes electrospray thruster 254 providing thrust in direction 255. The location and position of the electrospray thrusters enables full 3-axis control in translation and rotation or, in other words, full six degree-of-freedom control. As depicted, each rail includes a single electrospray thruster. However, if necessary, as space allows, additional thrust as needed can be accomplished by adding additional electrospray thrusters to any rail.

Figure 3:
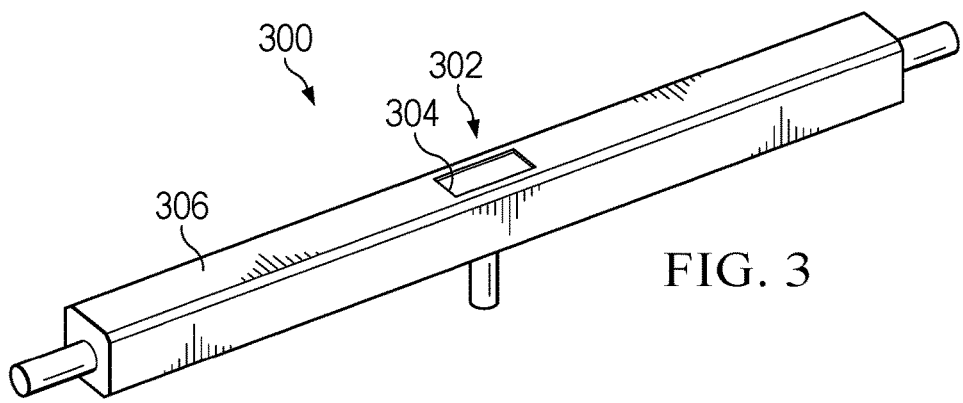
FIG. 3 illustrates a rail of a structure of a satellite, in accordance with an illustrative embodiment.

FIG. 3 illustrates rail 300 in accordance with an illustrative embodiment. Rail 300 is an example of one implementation of rail 106 in FIG. 1. Rail 300 includes propellant reservoir 302. Propellant reservoir 302 is inside rail 300. Propellant reservoir 302 includes opening 304 in face 306 of rail 300. High voltage propellant is contained within propellant reservoir 302. An electrospray thruster, for example, electrospray thruster 104 is embedded in rail 300 within propellant reservoir 302 such that the electrospray thruster is seated in opening 304 and flush with face 306. An electrospray thruster seated in opening 304 seals the propellant within propellant reservoir 302.

Figure 4:
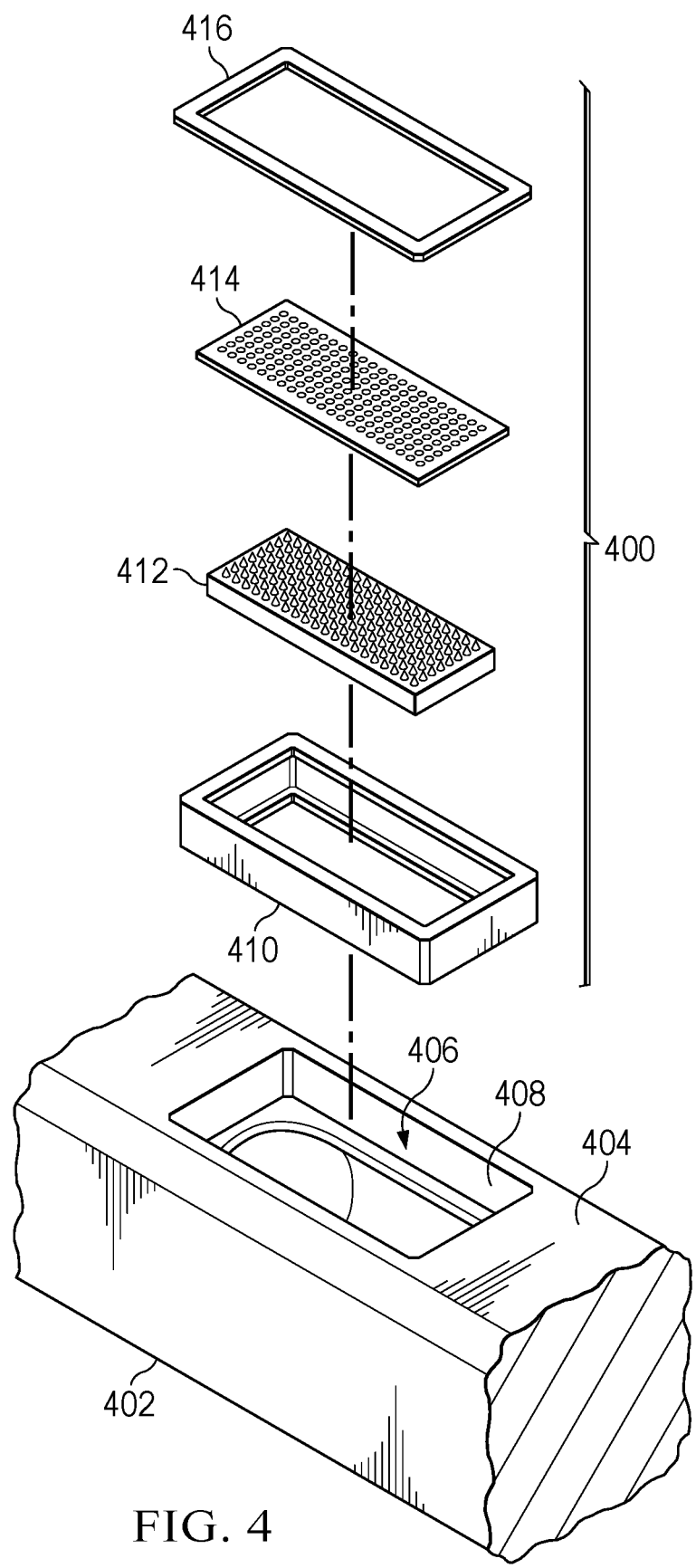
FIG. 4 illustrates an exploded view of an embedded electrospray thruster, in accordance with an illustrative embodiment.

FIG. 4 illustrates an exploded view of electrospray thruster 400 in accordance with an illustrative embodiment.

Electrospray thruster 400 is an example of one implementation of electrospray thruster 104 in FIG. 1. Electrospray thruster 400 is embedded in rail 402. Only a section of rail 402 is illustrated. Rail 402 includes face 404 and propellant reservoir 406. Propellant reservoir defines opening 408 in face 404.

Electrospray thruster 400 includes insulated casing 410, emitter array 412, extractor grid 414, and ground plate 416. Stepped shape 418 of insulated casing 410 positions each component of electrospray thruster 400 such that, when assembled and embedded in rail 402, extractor grid 414 and ground plate 416 sit flush with face 404. As a result, embedded electrospray thruster 400 adds no volume to the structure, in this example, rail 402.

Figure 5:
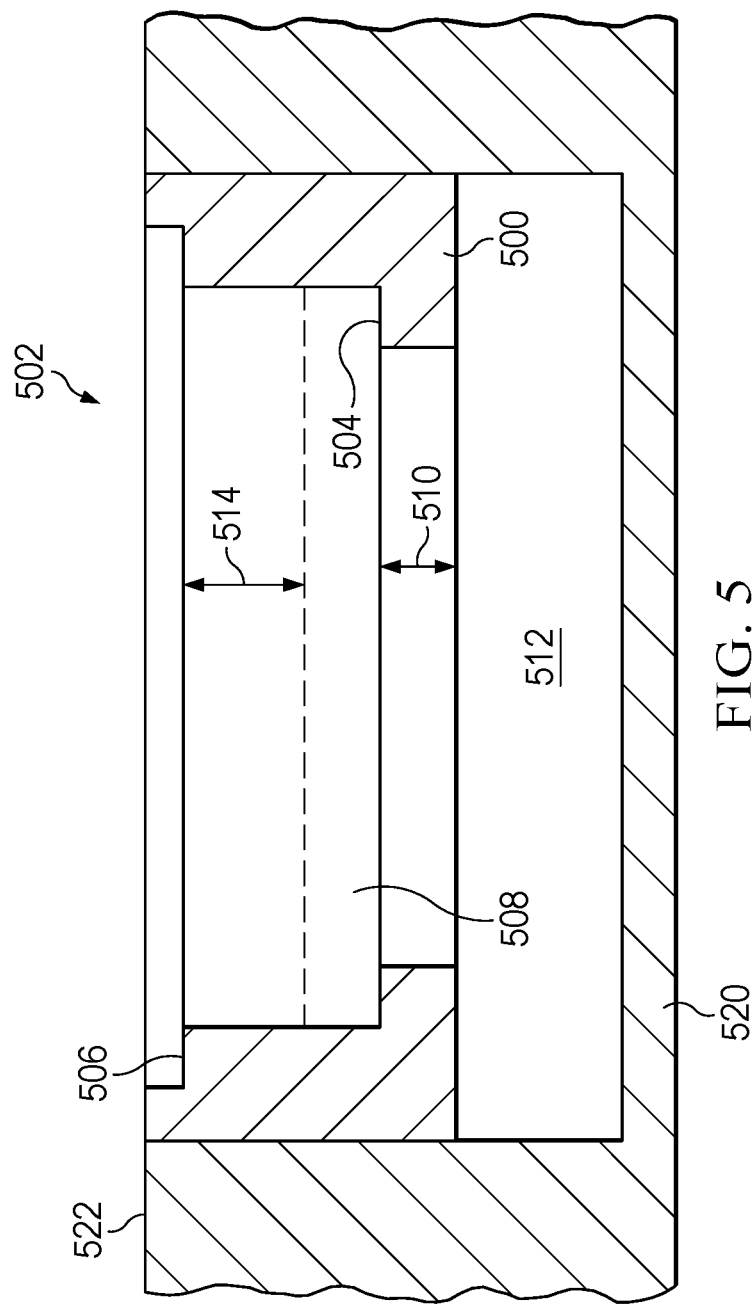
FIG. 5 illustrates a cross-section view of an insulated casing of an embedded electrospray thruster, in accordance with an illustrative embodiment.

FIG. 5 illustrates a cross-section view of insulated casing 500 embedded in rail 520 in accordance with an illustrative embodiment. Insulated casing 500 is an example of one implementation of insulated casing 120 in FIG. 1. Insulated casing 500 is embedded in rail 520. Rail 520 includes face 522 and propellant reservoir 512. Insulated casing 500 has stepped shape 502 defined in its interior. Stepped shape includes shoulder 504 and shoulder 506. Shoulder 504 provides a surface for supporting emitter array 508 (shown in shadow). Emitter array 508 is an example of emitter array 122 in FIG. 1 and emitter array 412 in FIG. 4. Shoulder 504 positions emitter array 508, such that emitter array 508 is spaced at least distance 510 from high voltage propellant located in propellant reservoir 512.

Shoulder 506 provides a surface for supporting an extractor grid and ground plate, for example, extractor grid 124 and ground plate 126 in FIG. 1 and extractor grid 414 and ground plate 416 in FIG. 4. Shoulder 506 positions the extractor grid and the ground plate, such they are spaced at least distance 514 from emitter array 508. Also, shoulder 506 positions the extractor grid and the ground plate, such they are flush with face 522.

Figure 6:
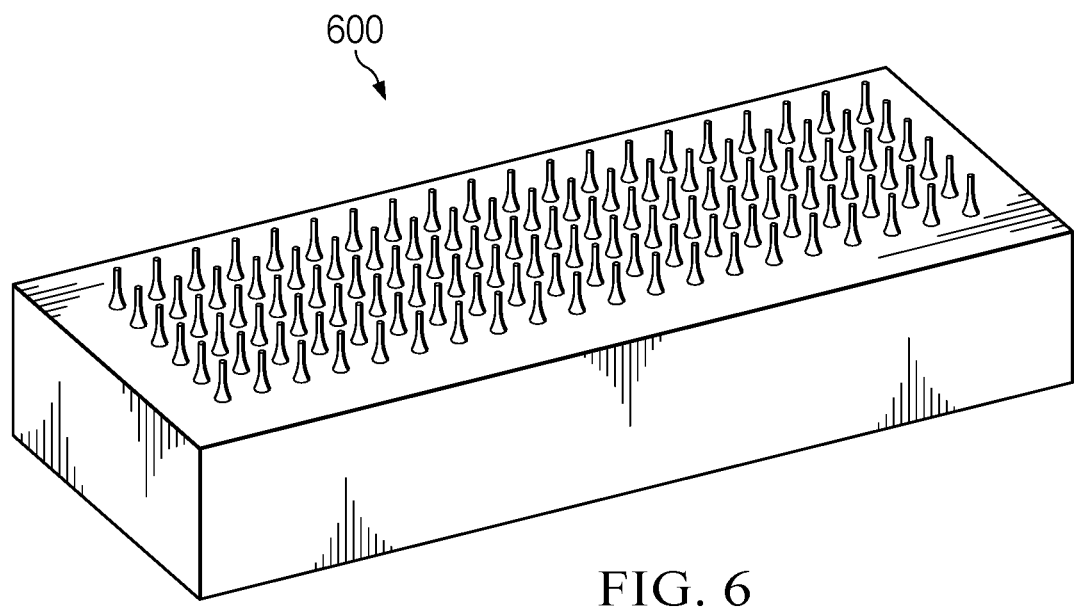
FIGS. 6-7 illustrate emitter arrays of an embedded electrospray thruster, in accordance with an illustrative embodiment.
Figure 7:
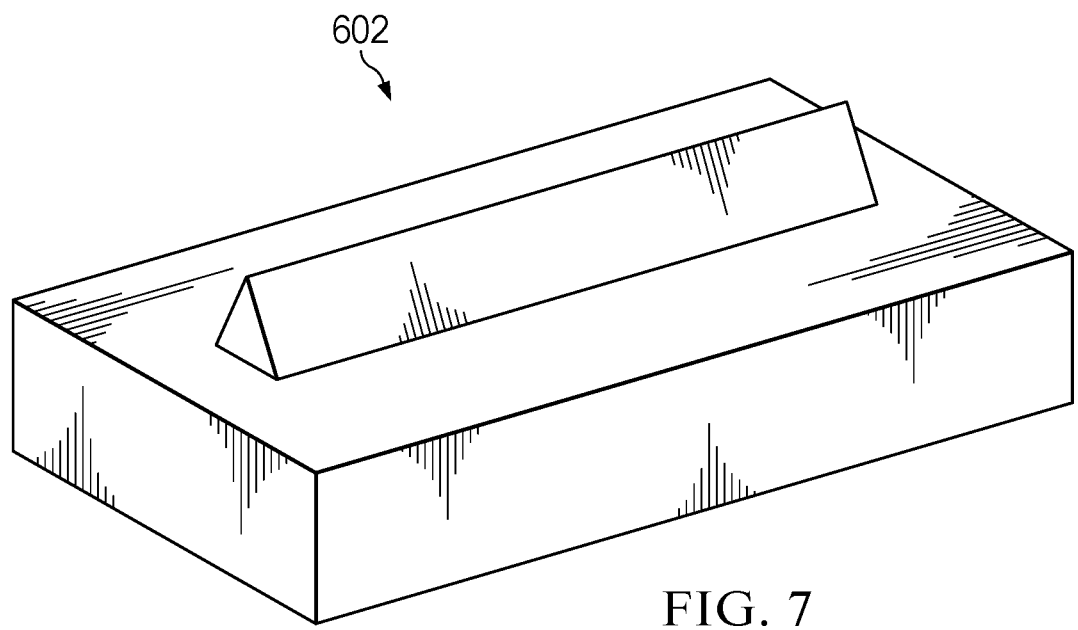

Referring to FIG. 6 and FIG. 7, emitter array 600 and emitter array 602 are illustrated examples of implementations of emitter array 122 in FIG. 1. Emitter array 600 is an example of a 120-tip emitter having conical pores arranged in rows while emitter array 602 is an example of a linear emitter. Emitter array 600 and emitter array 602 are comprised of, for example, porous glass to passively feed and store ionic propellant.

Figure 8:
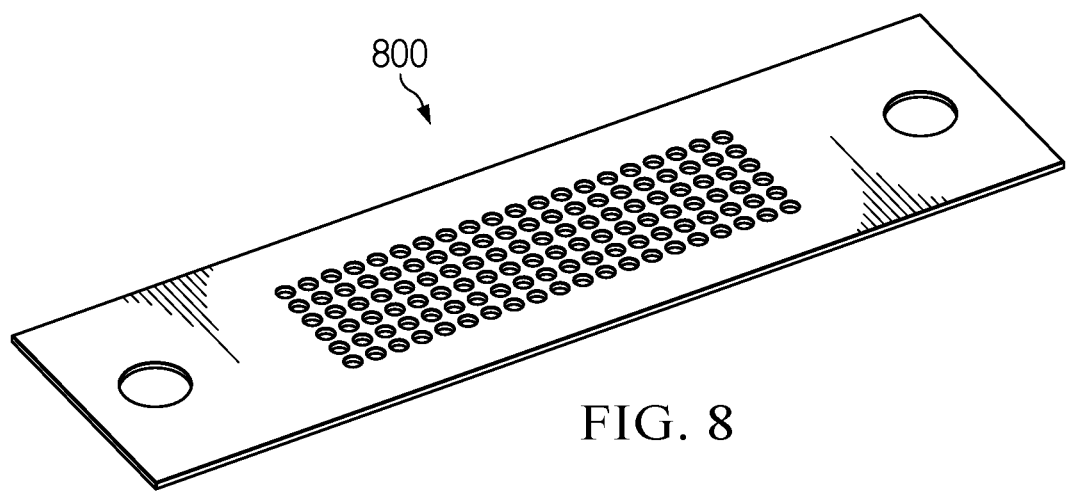
FIGS. 8-9 illustrate extractor grids of an embedded electrospray thruster, in accordance with an illustrative embodiment.
Figure 9:
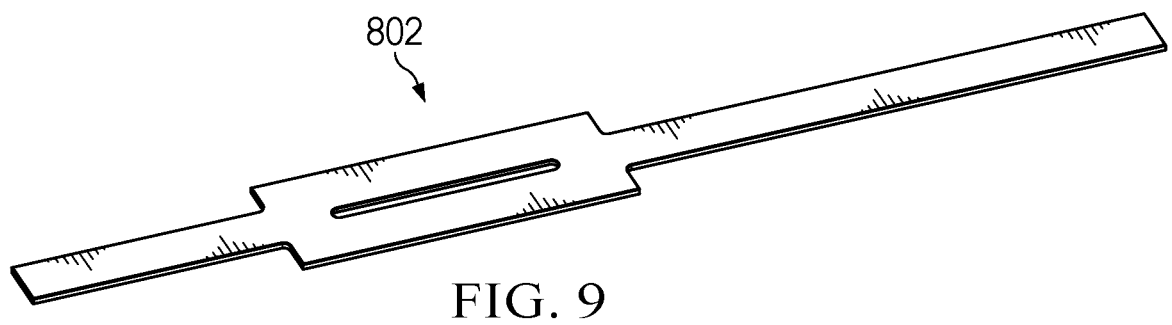

Referring to FIG. 8 and FIG. 9, extractor grid 800 and extractor grid 802 are illustrated examples of implementations of extractor grid 124 in FIG. 1. Extractor grid 800 is an example of 120-hole extractor grid having holes arranged in rows complementary to the conical pores of emitter array 600. Extractor grid 802 is an example of a linear extractor grid to be used in conjunction with emitter array 602.

Figure 10:
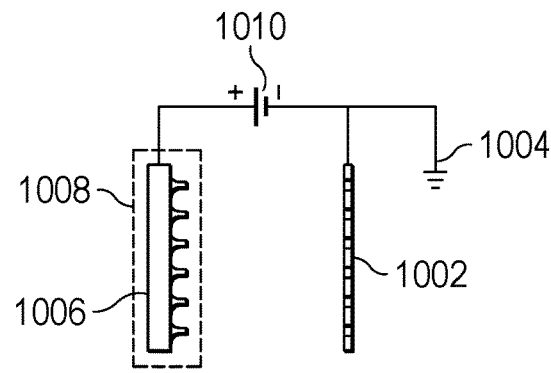
FIG. 10 illustrates shows an embedded electrospray thruster electrical diagram, in accordance with an illustrative embodiment.

When an electrospray thruster is embedded in a structure of a satellite, such as a rail, the electrical properties of each component are important. FIG. 10 shows an electrospray thruster electrical diagram.

To minimize the risk of arcing, extractor grid and ground plate 1002 is maintained at satellite ground 1004 to enable it to float to the same potential as the main satellite structure as dictated by the local ambient plasma conditions. High voltage is applied by power supply 1010 to the conductive propellant and emitter array 1006 using a distal electrode inserted into the propellant chamber, which is then electrically isolated from the surrounding elements by insulated casing 1008.

Extractor grid and ground plate combination 1002 is electrically neutral with the satellite structure. Emitter array and propellant 1006 are biased relative to extractor grid and ground plate 1002. The insulated casing provides electrical isolation for emitter array and propellant 1006.

Figure 11:
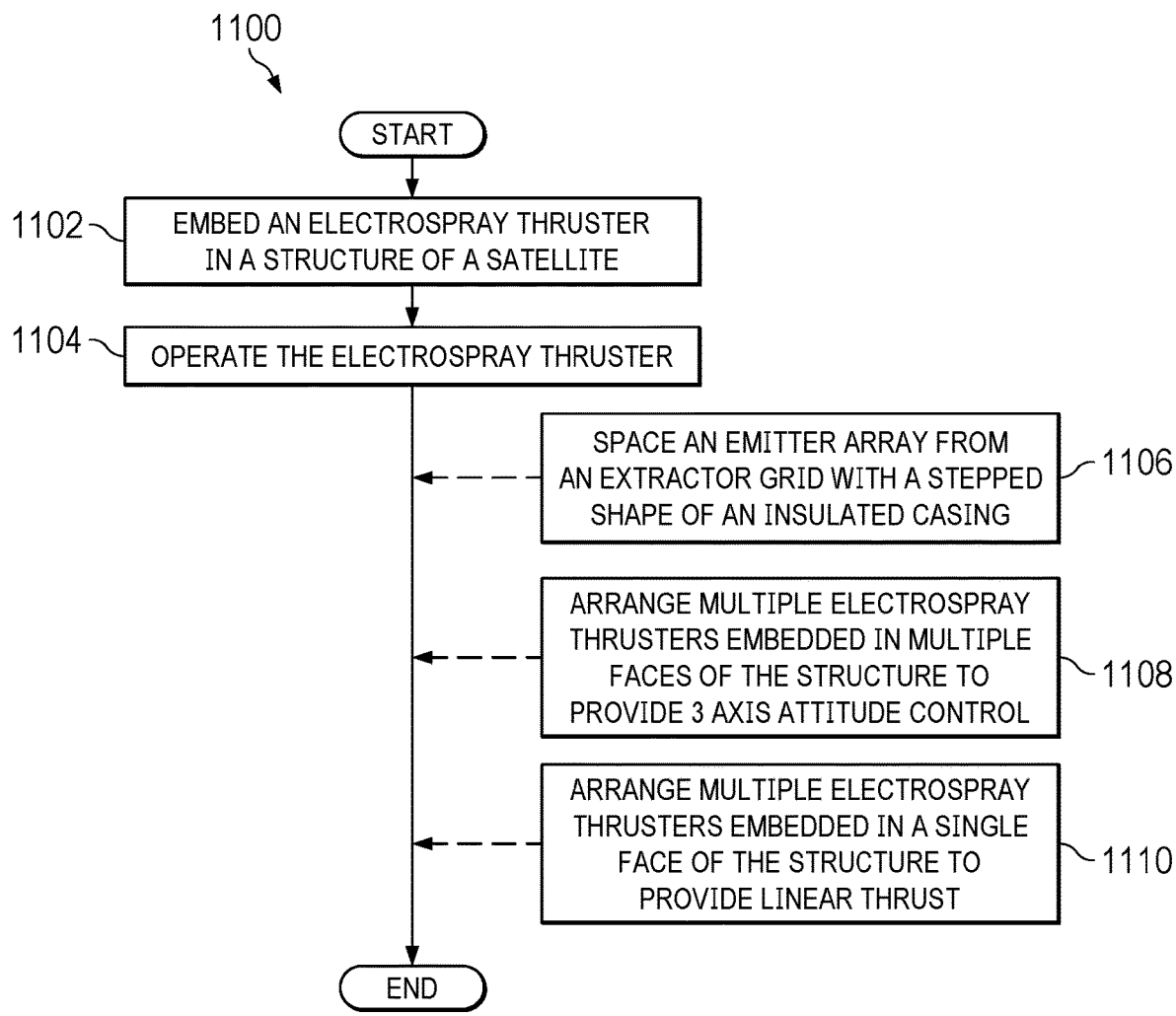
FIG. 11 is a flowchart of a method of propelling a satellite, in accordance with an illustrative embodiment.

FIG. 11 is a flow chart of the process 1100 to propel a satellite in accordance with an illustrative embodiment. At 1102, electrospray thruster 104 is embedded in structure 102 of satellite 100. At 1104, embedded electrospray thruster 104 is operated. At 1106, emitter array 122 is spaced from extractor grid 124 with stepped shape 128 of insulated casing 120. The stepped shape of the insulated casing includes interior shoulders that support the emitter array and separately support the extractor grid. At 1108, multiple electrospray thrusters are embedded in multiple faces of the structure. This multiple face arrangement provides 3-axis attitude control in translation and rotation of the satellite. At 1110, multiple electrospray thrusters are embedded in a single face of the structure. This arrangement provides linear thrust.

The operations described above are not relegated to the order the operations were presented. Some operations can be performed prior to previously described operations and some can be performed simultaneously. The order the operations were presented does not imply an order for the operations to be performed in.

Embedding electrospray thrusters with integrated propellant storage directly into small satellite structural elements combines the volume of the thruster with the volume of the rail. This enables larger volumes to be left for other mission critical elements such as payloads while retaining maneuverability. Enabling higher maneuverability on small satellites across a full six degree-of-freedom enables wide area coverage constellations, drag compensation for extended mission durations in low earth orbit (LEO), and precision attitude control.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A satellite, comprising:
an electrospray thruster embedded in an opening of a flat face of a structure of the satellite; and
the electrospray thruster comprising:
an insulated casing flush with the flat face;
an emitter array seated within the insulated casing;
an extractor grid spaced from the emitter array within the insulated casing, the extractor grid flush with the flat face; and
a ground plate seated within the insulated casing and surrounding the extractor grid, the ground plate flush with the flat face.

2. The satellite of claim 1, wherein the satellite is a CubeSat and the structure is a CubeSat rail.

3. The satellite of claim 1, wherein the electrospray thruster is embedded in a propellant reservoir formed in the structure of the satellite.

4. The satellite of claim 1, wherein the insulated casing comprises a stepped shape configured to provide spacing between the emitter array and the extractor grid.

5. The satellite of claim 1, wherein the insulated casing is embedded within a propellant reservoir formed in the structure of the satellite.

6. The satellite of claim 1, wherein multiple electrospray thrusters are embedded in multiple faces of the structure at orthogonal placement for 3-axis attitude control.

7. The satellite of claim 1, wherein multiple electrospray thrusters are embedded in a single face of the structure for linear thrust.

8. The satellite of claim 1, wherein the electrospray thruster embedded in the structure of the satellite does not increase a volume of the structure.

9. The satellite of claim 1, wherein the electrospray thruster is embedded in a propellant reservoir formed in the structure of the satellite and wherein the insulated casing seals the opening to seal in propellent contained within the propellant reservoir.

10. The satellite of claim 1, wherein the extractor grid and the ground plate are electrically neutral with the structure of the satellite.

11. The satellite of claim 1, wherein the insulated casing provides electrical isolation for the emitter array relative to the structure of the satellite.

12. The satellite of claim 1, wherein the insulated casing comprises a first shoulder for supporting the emitter array and a second shoulder for supporting the extractor grid and the ground plate, the first shoulder spaced from the second shoulder.

13. A method of propelling a satellite, comprising:
embedding an electrospray thruster in an opening of a flat face of a structure of the satellite, wherein the electrospray thruster comprises an insulated casing flush with the flat face, an emitter array seated within the insulated casing, an extractor grid spaced from the emitter array within the insulated casing, the extractor grid flush with the flat face, and a ground plate seated within the insulated casing and surrounding the extractor grid, the ground plate flush with the flat face; and
operating the electrospray thruster.

14. The method of claim 13, wherein the electrospray thruster is embedded in a propellant reservoir formed in the structure of the satellite.

15. The method of claim 13, further comprising spacing the emitter array from the extractor grid with a stepped shape of the insulated casing.

16. The method of claim 13, wherein the embedding an electrospray thruster comprises embedding the insulated casing within a propellant reservoir formed in the structure of the satellite and further comprising sealing the opening with the insulated casing to seal in propellant contained within the propellant reservoir.

17. The method of claim 13, wherein the insulated casing is embedded within a propellant reservoir formed in the structure of the satellite.

18. The method of claim 13, further comprising arranging multiple electrospray thrusters embedded in multiple faces of the structure to provide 3-axis attitude control.

19. The method of claim 13, further comprising arranging multiple electrospray thrusters embedded in a single face of the structure to provide linear thrust.

20. The method of claim 13, further comprising electrically isolating the electrospray thruster relative to the structure of the satellite with the insulated casing.

* * * * *